United States Patent
Manuel et al.

(10) Patent No.: US 7,222,834 B2
(45) Date of Patent: May 29, 2007

(54) TOOL AND A METHOD FOR MAKING A TOOL

(75) Inventors: Mark Manuel, Shelby Township, MI (US); Thomas N. Greaves, Rochester Hills, MI (US)

(73) Assignee: FloodCooling Technologies, LLC, Bloomfield Hills, MI (US)

( * ) Notice: Subject to any disclaimer, the term of this patent is extended or adjusted under 35 U.S.C. 154(b) by 327 days.

(21) Appl. No.: 09/930,601

(22) Filed: Aug. 14, 2001

(65) Prior Publication Data

US 2004/0051027 A1 Mar. 18, 2004

(51) Int. Cl.
*B29C 33/04* (2006.01)
(52) U.S. Cl. .................. 249/79; 249/160; 425/DIG. 30
(58) Field of Classification Search .................. 249/79, 249/80, 81, 100; 425/DIG. 30
See application file for complete search history.

(56) References Cited

U.S. PATENT DOCUMENTS

| | | | |
|---|---|---|---|
| 1,539,887 A * | 6/1925 | Vandergrift | ................. 165/170 |
| 2,458,427 A * | 1/1949 | Russell et al. | ............. 76/107.1 |
| 3,416,766 A * | 12/1968 | Miller | ......................... 249/79 |
| 4,141,531 A * | 2/1979 | Strausfeld | .................... 249/80 |
| 4,474,722 A | 10/1984 | Martin | |
| 4,702,969 A | 10/1987 | Bunkoczy | |
| 4,746,055 A | 5/1988 | Ingram | |
| 4,810,591 A | 3/1989 | Sakai | |
| 4,867,412 A | 9/1989 | Greune | |
| 4,946,552 A | 8/1990 | Onnie | |
| 4,997,602 A | 3/1991 | Trimble | |
| 5,031,483 A | 7/1991 | Weaver | |
| 5,032,469 A | 7/1991 | Merz | |
| 5,079,102 A | 1/1992 | Tanaka | |
| 5,106,290 A | 4/1992 | Carver et al. | |
| 5,151,167 A | 9/1992 | Truong | |
| 5,156,322 A | 10/1992 | Thoi | |
| 5,247,861 A | 9/1993 | Jahn | |
| 5,256,496 A | 10/1993 | Kluczynski | |
| 5,273,803 A | 12/1993 | Metcalf | |
| 5,330,343 A | 7/1994 | Berteau | |

(Continued)

FOREIGN PATENT DOCUMENTS

DE 38370/73 8/1973

(Continued)

OTHER PUBLICATIONS

Walczyk et al., "Rapid Tooling for Sheet Metal Forming Using Profiled Edge Laminations—Design Principles and Demonstration"; dated Nov. 1998.*

(Continued)

*Primary Examiner*—Donald Heckenberg
(74) *Attorney, Agent, or Firm*—Brooks Kushman P.C.

(57) ABSTRACT

A tool 10 and a method for creating the tool 10 which is comprised of several selectively coupled sectional members 12, 16, and which includes at least one cooling channel 14. In one embodiment, each sectional member 12, 16, which is to be used to form the at least one cooling channel 14, has respective indented channels 18, 20. Channel 18 of member 12 registers with a unique one of the channels 20 of member 16 to which member 12 is coupled, thereby forming the unique cooling passage 14. Other embodiments are disclosed which also provide desired cooling paths 14.

3 Claims, 3 Drawing Sheets

U.S. PATENT DOCUMENTS

| | | | |
|---|---|---|---|
| 5,345,052 A | 9/1994 | Puddephatt | |
| 5,347,423 A | 9/1994 | deNeuf | |
| 5,377,116 A | 12/1994 | Wayne et al. | |
| 5,399,239 A | 3/1995 | Pai | |
| 5,400,946 A | 3/1995 | Weise | |
| 5,421,544 A | 6/1995 | Roop | |
| 5,439,622 A | 8/1995 | Pennisi et al. | |
| 5,462,263 A | 10/1995 | Feltrin | |
| 5,529,805 A | 6/1996 | Iacovangelo | |
| 5,641,448 A | 6/1997 | Yeung | |
| 5,779,833 A | 7/1998 | Cawley et al. | |
| 5,792,492 A * | 8/1998 | Takahashi | 425/547 |
| 5,793,015 A | 8/1998 | Walczyk | |
| 5,830,585 A | 11/1998 | Hosoe | |
| 5,847,958 A | 12/1998 | Shaikh et al. | |
| 5,869,353 A | 2/1999 | Levy | |
| 5,878,619 A | 3/1999 | Walczak | |
| 5,948,548 A | 9/1999 | Welty | |
| 6,024,851 A | 2/2000 | Radhakrishnan | |
| 6,025,036 A | 2/2000 | McGill | |
| 6,038,525 A | 3/2000 | Maguire | |
| 6,060,392 A | 5/2000 | Essaian | |
| 6,063,436 A | 5/2000 | Pavell | |
| 6,081,328 A | 6/2000 | Eng | |
| 6,090,207 A | 7/2000 | Knauss | |
| 6,090,507 A | 7/2000 | Grenon | |
| 6,103,402 A | 8/2000 | Marcin, Jr. | |
| 6,109,332 A | 8/2000 | Sachs | |
| 6,113,752 A | 9/2000 | Hollstein | |
| H1933 H | 1/2001 | Zabinski | |
| 6,355,331 B2 | 3/2002 | Hillier | |
| 6,391,473 B2 | 5/2002 | Numakura | |
| 6,401,001 B1 | 6/2002 | Jang et al. | |
| 6,472,029 B1 | 10/2002 | Skszek | |
| 6,495,272 B1 | 12/2002 | Creber | |
| 6,627,835 B1 | 9/2003 | Chung | |
| 2002/0175265 A1 * | 11/2002 | Bak et al. | 249/79 |
| 2004/0128016 A1 | 7/2004 | Stewart | |

FOREIGN PATENT DOCUMENTS

| | | |
|---|---|---|
| DE | 3711470 A1 | 10/1988 |
| EP | 0 775 550 A1 | 5/1997 |
| EP | 1216 806 A2 | 6/2002 |
| JP | 58-091123 | 5/1983 |
| JP | H04-086212 A | 3/1992 |
| WO | WO 8707538 | 12/1987 |
| WO | WO 88/07932 | 10/1988 |
| WO | WO 95/08416 | 3/1995 |
| WO | WO-A-9508416 | 3/1995 |
| WO | WO 01/70450 A1 | 9/2001 |
| WO | WO 03/043795 | 5/2003 |
| WO | WO 03043795 | 5/2003 |

OTHER PUBLICATIONS

A New Rapid Tooling Method For Sheet Metal Forming Dies Inventor :Daniel Walczyk, undated.

* cited by examiner

TOOL AND A METHOD FOR MAKING A TOOL

FIELD OF THE INVENTION

The present invention generally relates to a tool and to a method for making a tool and more particularly, to a tool which may be formed by the creation and coupling of members which have certain respective attributes which cooperatively form cooling passages within the tool in an efficient manner.

BACKGROUND OF THE INVENTION

A tool, such as a mold, die, or other object formation apparatus is used to repeatedly form or create substantially similar objects or products. Conventionally, the tool is formed by machining or "working" a block of material in a certain manner, thereby forming or creating the tool in a desired shape and geometrical configuration. Alternatively, the tool may be formed by a laminar process in which various sectional members are created and selectively coupled (e.g., by gluing, bolting, welding, or bonding), effective to allow the coupled members to cooperatively form the tool. Particularly, holes are formed within the tool and a slotted pin may be placed within each of the formed holes. Steam is blown through the holes, through the contained pins to create the part and water is then forced through the tool to cool the part. The holes are used both to melt the material which is used to form the part and to cool the part.

The holes and slotted pins are cooperatively effective to allow air, steam, and/or water to pass through the tool in order to or heat or melt material, such as styrene, and to cool the tool and/or the produced item which may reside within the tool (e.g., the heat travels from the item to the ambient environment through a medium which may be contained within and/or which may selectively travel through the pins), effective to increase the useful operating life of the tool and to increase the likelihood of producing an item having a desired shape and attributes.

While the foregoing approach does allow for the creation of cooling passages, it represents a relatively inefficient and costly process which undesirably increases the overall cost of production and may undesirably damage the formed tool. Such damage is particularly undesirable since many of these tools are relatively expensive.

There is therefore a need for a method to selectively create heating or cooling passages within a tool which overcomes some or all of the previously delineated drawbacks of prior techniques. Moreover, there is a further need to create a tool by the use of a method which allows cooling and heating passages to be efficiently formed within the tool and which does not potentially cause structural damage to the formed tool. These and other needs are addressed by the present invention, as is more fully delineated below.

SUMMARY OF THE INVENTION

It is a first non-limiting advantage of the present invention to provide a method for creating cooling passages within a tool which overcomes some or all of the previously delineated drawbacks of prior techniques.

It is a second non-limiting advantage of the present invention to provide a method for creating a tool which overcomes some or all of the previously delineated drawbacks and which, by way of example and without limitation, allows for the efficient formation of cooling passages within the tool.

It is a third non-limiting advantage of the present invention to provide a tool having cooling passages which may be efficiently and integrally formed within the tool and which allow a created item to be efficiently cooled while concomitantly increasing the working life of the tool.

According to a first aspect of the present invention, a tool is provided and includes at least a first sectional member and a second sectional member which is selectively coupled to said first sectional member and which cooperates with the first sectional member to form the tool, the at least first sectional member having a first portion and the second sectional member having a second portion which is at least partially aligned with the first portion when the second sectional member is coupled to the first sectional member and which cooperates with the first portion to form a cooling passage within the tool.

According to a second aspect of the present invention, a tool is provided. The tool is made by the process of creating a first member having at least one depressed portion; creating a second member having at least one depressed portion; registering the at least one depressed portion of the first member with the at least one depressed portion of the second member by attaching the second member to the first member, thereby forming the tool and causing the first and second depressed portions to cooperatively form a cooling passageway within the formed tool.

According to a third aspect of the present invention, a method is provided for making a tool. The method includes the steps of forming a first member having a first portion of a certain shape; forming a second member having a second portion of a certain shape; attaching the first member to the second member while registering the first portion with the second portion, thereby creating a tool having a passageway which is cooperatively formed by the registered first and second portions.

These and other features, aspects, and advantages of the present invention will become apparent to those of ordinary skill in the art from a reading of the following detailed description of the preferred embodiment of the invention and by reference to the following drawings.

DETAILED DESCRIPTION OF THE PREFERRED EMBODIMENT OF THE INVENTION

Figure 1:
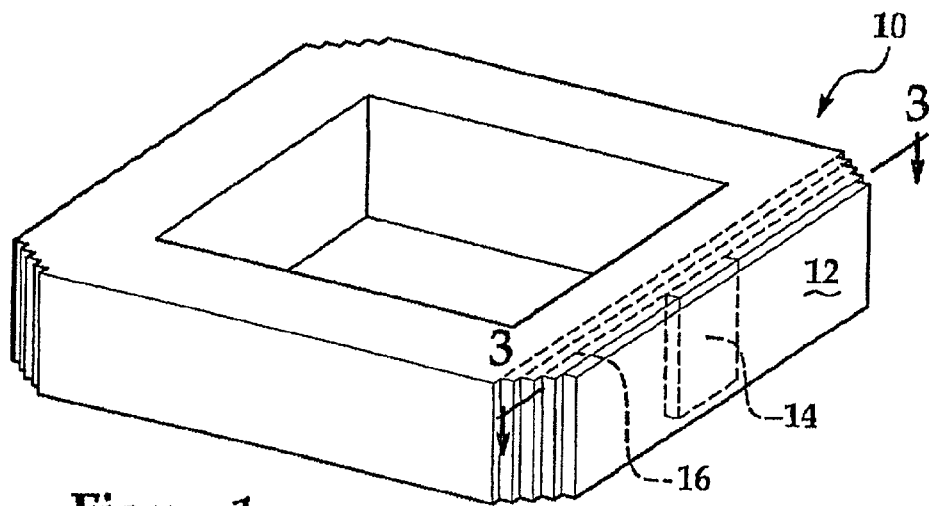
FIG. 1 is a perspective view of a tool which is made in accordance with the teachings of the preferred embodiment of the invention.
Figure 2:
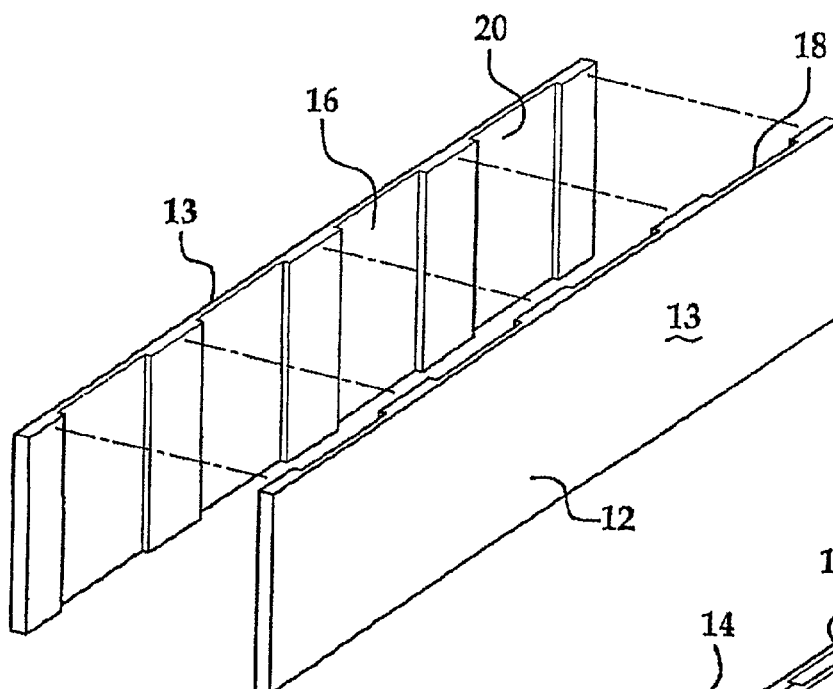
FIG. 2 is a perspective unassembled view of a pair of sectional members of the tool which is shown in FIG. 1.
Figure 3:
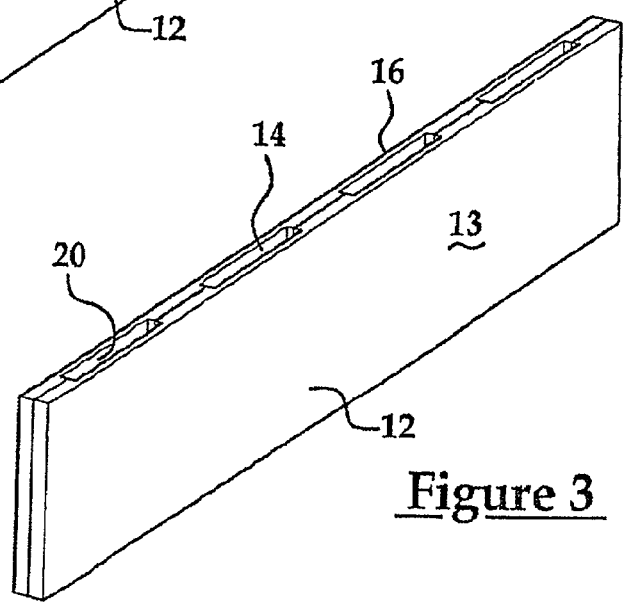
FIG. 3 is a perspective view of the tool which is shown in FIG. 1 and which is taken along view line 3-3.

Referring now to FIGS. 1 and 2, there is shown a tool 10 which is made in accordance with the teachings of the preferred embodiment of the invention. It should be realized that tool 10 may be of any substantially desired shape or geometric configuration and that nothing in this Application is intended to limit the applicability of the invention to a particular type of tool or apparatus. Rather, the tool 10 is one non-limiting example of a tool which may be produced according to the invention.

Particularly, tool 10 is made by the use of a lamination process in which several sectional members, such as sectional members 12,16 are selectively formed and then coupled or connected in a predetermined manner in order to cooperatively form the tool 10 having several cooling passages, such as and without limitation cooling passage 14 which is positioned between adjacent sectional members 12, 16. It should be appreciated that nothing in this Application is meant to limit the applicability of the invention to a particular type, shape, or configuration of sectional members. Moreover, the sectional members 12,16 are used for illustrative purposes only and are not meant to limit the invention in any manner.

Particularly, as will be noted from the discussion below and according to the preferred embodiment of the invention, cooling passages, such as passage 14, are selectively formed between adjacent sectional members, such as members 12, 16, by the cooperation of respective portions of the sectional members having a desired shape or geometric configuration and these cooling passages allow water, steam, and/or other material to traverse the tool 10 in order to cool the tool 10 and to cool the item or product which may be resident within the tool 10. The term "adjacent" means the sectional members are physically connected, within or as part of the tool 10. This approach is more fully explained below with respect to adjacent sectional members 12, 16. However, it should be apparent that by allowing these cooling passages, such as passage 14, to be created by structural portions or physical attributes and/or characteristics of the sectional members, the need for "drilling cooling holes" is obviated, thereby reducing/eliminating the potential for damage to the tool 10, concomitantly reducing overall production cost, and overcoming the various other previously delineated drawbacks.

Particularly, each of the adjacent sectional members 12, 16, which are to form cooling passage 14, respectively includes a respective flat or broad surface 13 and at least one depressed or recessed slot, groove, or indentation 18, 20, which may be formed by etching, laser cutting, or substantially any other material removal process. The respective portions 18, 20 are "registered" (e.g., each groove 18 at least partially overlays, is at least partially and linearly coextensive with, and/or is at least partially aligned with a unique one of the grooves 20) when the sectional members 12, 16 are connected (e.g., by a conventional lamination process), thereby forming the cooling paths 14. Hence, a cooling path 14, is formed by the registration (e.g., the at least partial "alignment") of a unique one of the portions 18 with a unique one of the portions 20. These portions 18, 20 may be of any desired and respective shape, size, and/or geometric configuration. Moreover, portions 20 of sectional member 16 may be of a different shape than portion 18 of sectional member 12 although, in FIG. 1, these are shown as generally rectangular in nature. Hence, cooling passages 14 may be selectively formed along any location or path within tool 10 by appropriately causing these portions 18, 20 to be created and to register in the desired location, and/or along the desired path.

Figure 4:
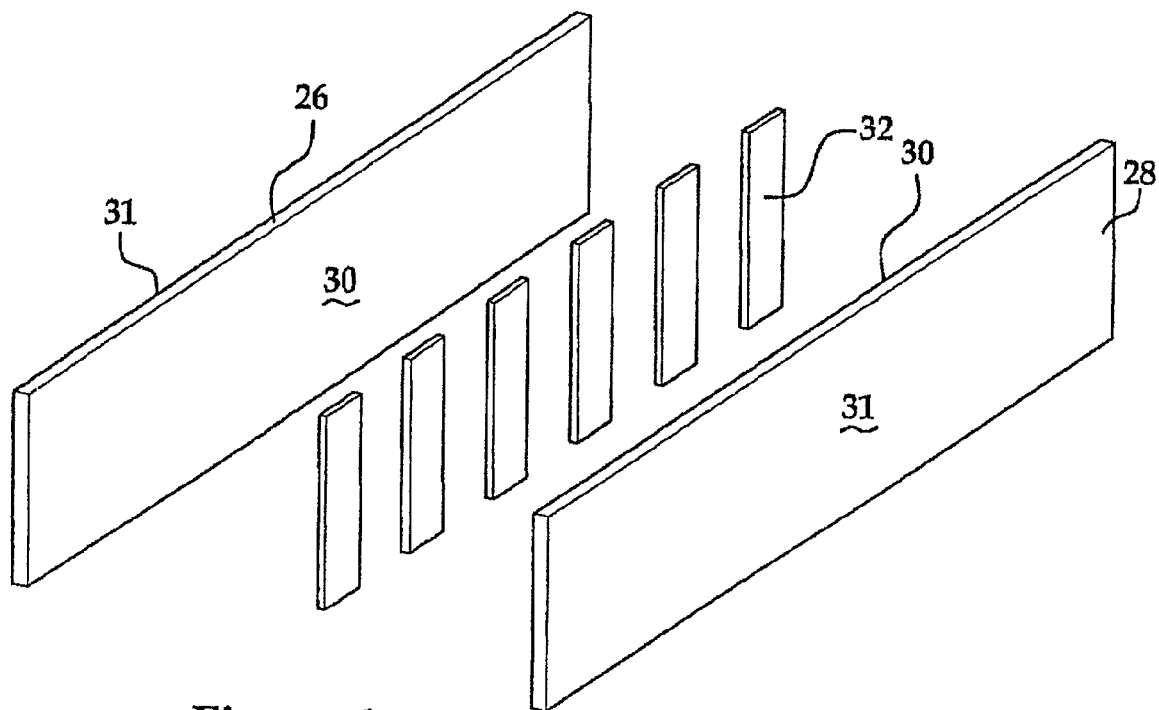
FIG. 4 is a perspective unassembled view of a pair of sectional members which are made in accordance with the teachings of an alternate embodiment of the invention in combination with several spacer members.
Figure 5:
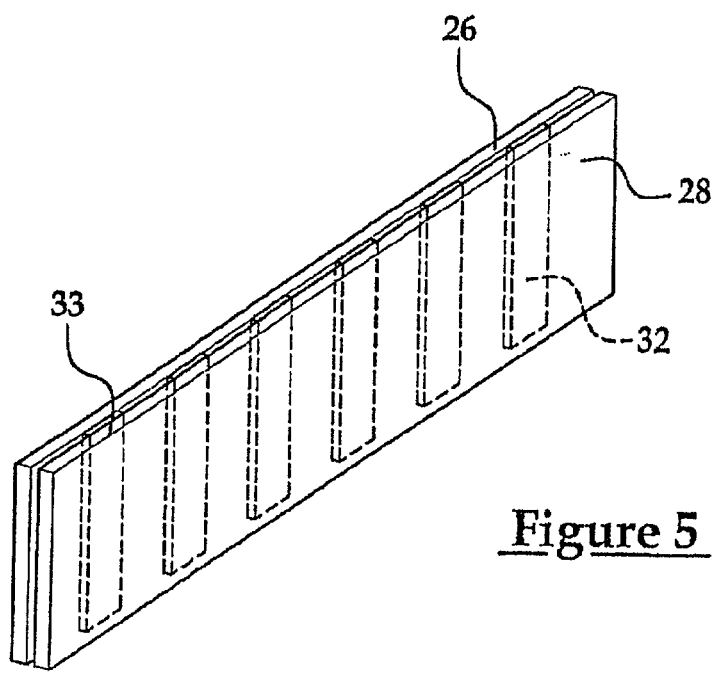
FIG. 5 is a view of an alternate embodiment of the tool which is shown in FIG. 1 taken along view line 3-3.

An alternate embodiment is shown in FIGS. 4 and 5. Particularly, in this alternate embodiment, the sectional members 26, 28, which are to form a cooling passageway 14, each have a pair of opposed and substantially broad flat faces 30, 31. Substantially rectangular spacer members 32 are selectively placed between the respective faces 30 of the members 26, 28 which are to be coupled and are effective to form cooling passages 32 which traverse through the formed tool. Spacer members 32 may be formed in any desired shape and size and a cooling passage is formed between each pair of spacer members and alongside the "end spacer members" (e.g., the spacer members 32 which are not disposed between two other spacer members).

Figure 6:
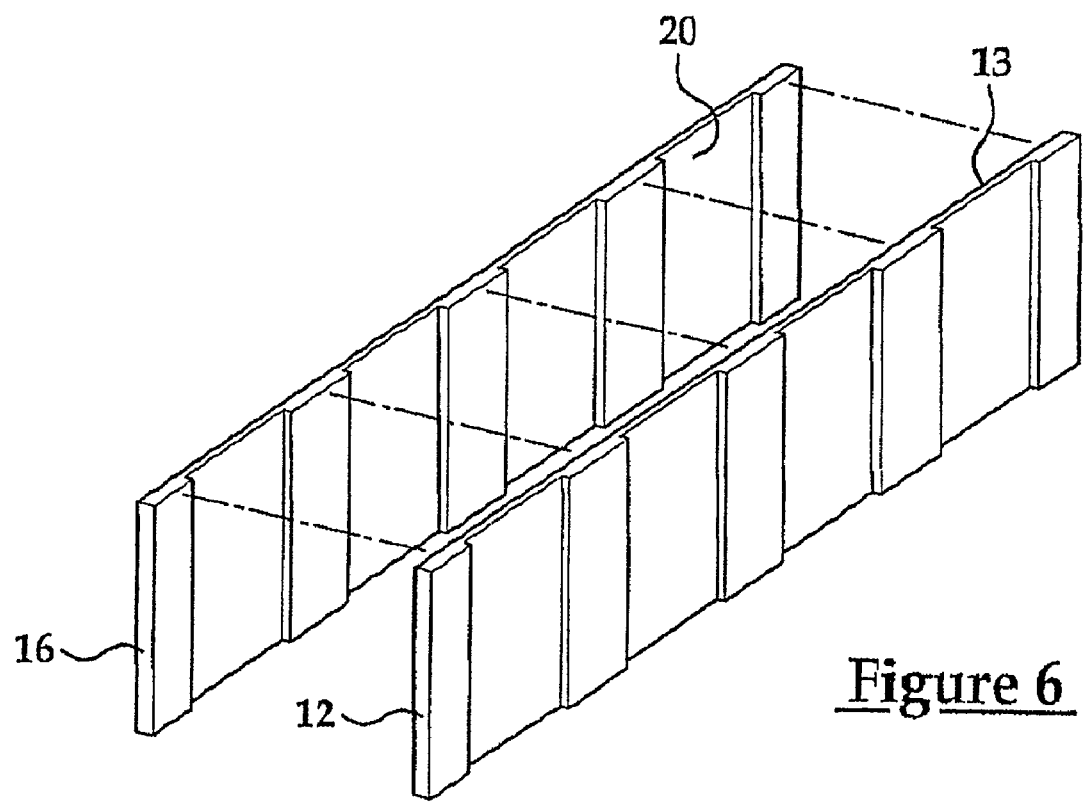
FIG. 6 is a perspective unassembled view of a pair of sectional members which are made in accordance with the teachings of yet another alternate embodiment of the invention.

In yet another embodiment of the invention, as best shown in FIG. 6, the broad face 13 of member 12 overlays the portions 20 of member 16. In this manner, face 13 cooperates with portions 20 to form the desired cooling passages 14 through each groove or indentation 20.

It should be appreciated that the invention is not limited to the exact construction and method which has been described above, but that various alterations and modifications may be made without departing from the spirit and the scope of the inventions as are delineated in the following claims.

What is claimed is:

1. A tool comprising a first member; a second member; and at least one solid spacer member, said at least one solid spacer member being coupled to said first and second members while cooperating with said first and second members to form a tool having a cooling passage, wherein said spacer is attached to said first member by use of a first welded connection, wherein said spacer is attached to said second member by use of a second welded connection, and wherein said solid spacer member is generally rectangular in shape.

2. A tool comprising a first sectional member having a first flat surface portion; a second sectional member having a second flat surface portion; a plurality of substantially identical, generally rectangular shaped, and substantially solid spacer members, wherein each of said substantially solid spacer members are respectively coupled to said first flat surface at any respectively desired location and wherein each of said substantially solid spacer members are respectively coupled to said second flat surface, thereby said substantially solid spacer members cooperatively couple said first sectional member to said second sectional member while causing said first sectional member to be linearly coextensive to said first sectional member while concomitantly forming a plurality of passages between said first and said second sectional members.

3. The tool of claim 2 wherein each of said substantially solid spacer members are welded to said first flat surface.

* * * * *